C. W. SALADEE

Assignor to W. W. GRIER.

PLEASURE VEHICLES.

No. 7,890. Reissued Sept. 18, 1877.

WITNESSES.

R. W. Fenshall

Jno. K. Smith

INVENTOR.

Cyrus W. Saladee by Bakewell & Ken

Attys

N. PETERS, PHOTO-LITHOGRAPHER, WASHINGTON, D. C.

UNITED STATES PATENT OFFICE.

CYRUS W. SALADEE, OF WASHINGTON, DISTRICT OF COLUMBIA, ASSIGNOR TO WM. W. GRIER, OF HULTON, PENNSYLVANIA.

IMPROVEMENT IN PLEASURE-VEHICLES.

Specification forming part of Letters Patent No. 127,371, dated May 28, 1872; Reissue No. 7,890, dated September 18, 1877; application filed July 19, 1877.

DIVISION B.

*To all whom it may concern:*

Be it known that I, CYRUS W. SALADEE, formerly of St. Catharine's, in the Dominion of Canada, now of Washington, District of Columbia, have invented certain Improvements in Pleasure-Vehicles, of which the following is a specification:

The first part of my invention relates to the construction of light gearing with side half-elliptic springs and without perch, the springs being connected to the hind axle in connection with under-braces, so as to relieve the springs from end strain, and so as to prevent the rotation of the axle by the vibration of the springs.

The second part of my invention relates to securing and operating the ends of half-elliptic side springs upon what I term a "carrier-brace," so as to admit of the spring operating in a stirrup on the outer ends of the last-mentioned brace, as well as to relieve the spring from end strain, by securing the inner end of this carrier-brace to the under side of the spring, at or near its center.

I will now proceed to describe my invention in detail, referring for that purpose to the accompanying drawing, which forms a part of this specification, and in which—

Figure 1:
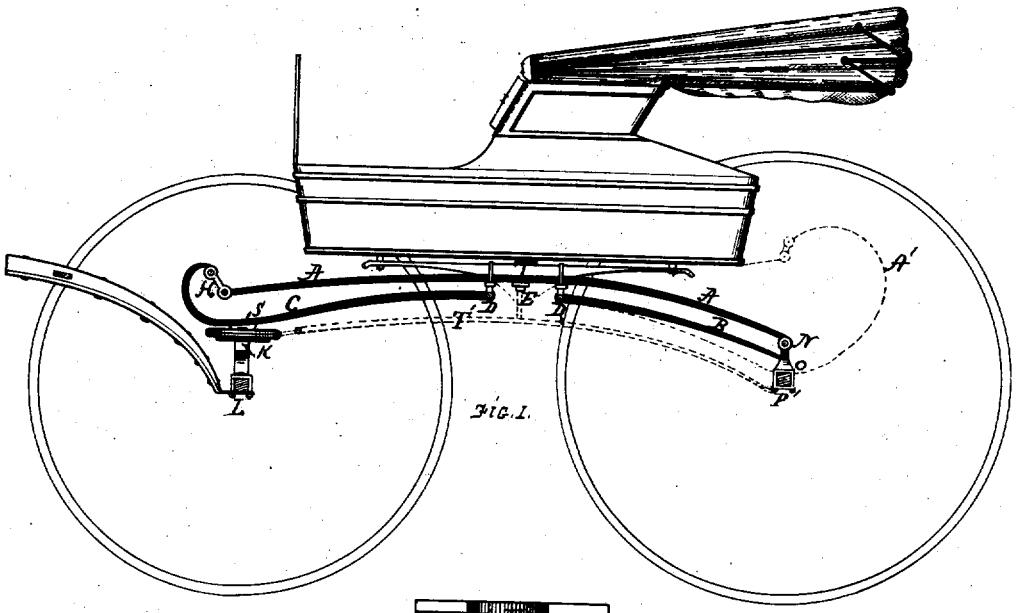
Figure 5:
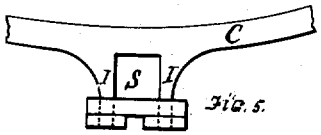
Figure 4:
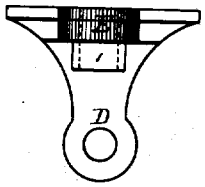
Figure 3:
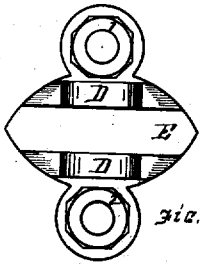
Figure 6:
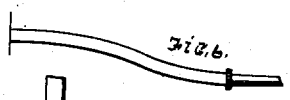
Figure 2:
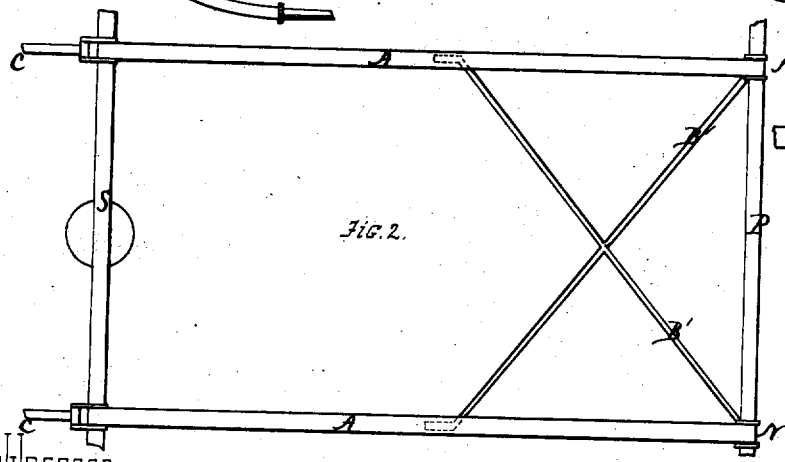
Figure 7:
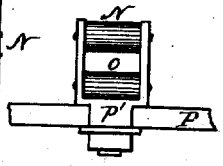

Figure 1 is a side elevation of a complete buggy embodying my invention. Fig. 2 is a plan view of the springs, hind axle, cross-braces, front spring-bar, and fifth-wheel. Fig. 3 is a bottom face view of the clip-yoke to the main spring-bars T, and for the reception of the under and carrier braces B C, Fig. 1. Fig. 4 is a side elevation of Fig. 3. Fig. 5 is a side view of a part of the carrier-brace C, (seen in Fig. 1,) showing how it is secured to cross-bar S. Fig. 6 is a front view of the front axle arched up in the center. Fig. 7 is a rear view of the shackle-clip P′ in position on the hind axle, and with the heads N of the spring and the under-brace B in position between the ends of the clip.

Like letters refer to like parts wherever they occur.

The springs shown are the ordinary half-elliptic side spring, of required length and proportion.

Neither of the axles have a "bed-wood" on them, but are wrought and arched up in the center, as the case may require.

The thills or pole and front axle are rigidly connected at their point of contact, while the center of the axle is bowed to receive the fifth-wheel, and between which and the axle is interposed a hinge-joint to admit of raising and lowering the points of the thills or pole.

The hind ends of the springs A are secured and operated between the ears of the shackle-clip P′, as seen in Figs. 1 and 7, and in which is had two bearings, the upper one, N, (see Fig. 7,) passing a bolt to receive the end of the spring, and O passing the bolt to receive the rear end of the under-brace B, and the whole clipped to the axle, as seen in Figs. 1 and 7.

Upon the center of the spring is placed the spring-bar T, and there secured by clips, as shown in Fig. 1. These clips take a yoke, E, on which is formed the ears D D, a bottom view of which is had in the enlarged view, Fig. 3, and a side elevation is had of the same in Fig. 4.

The ears D D receive the inner ends of the under and carrier braces B C on a bolt passing through them.

These braces B may be placed in position diagonally across each other, as seen in Fig. 2, B′, or they may be applied directly under the spring, and in a line with them, as seen in Fig. 1, and an extra pair of cross-braces, B′, Fig. 2, applied, and which will prevent one side of the body upon the springs from being depressed more than the other when the weight is all thrown upon one spring.

The points of connection of the front ends of the under-brace B, at D, is from the center of the edge of the spring at that point to the center of the bolt, passing through the eye at D the same distance as between the two bearings, from center to center, at N O, Figs. 1 and 7; and thus, as the spring is depressed, the under-brace B is permitted to act with the spring, and, being connected at rigid points at E D and N O, they operate parallel to each other, and so effectually prevent the rotation of the axle in the hub of the wheel by the vibration of the spring. This under-brace serves the best purpose when made of steel, and bent to the same curve of the spring, as shown in Fig. 1; and in some instances I propose making this under-brace of a single or double leaf of spring-steel, of the same dimensions as are the leaves of the mainspring A, when the brace-spring B and the spring A will vibrate together in their relative parallel position to each other.

The point O for the bearings of the rear end of the under-brace R is not necessarily located on the top side of the axle, as shown by Figs. 1 and 7, but may be placed in position immediately under the center of the axle, and lower the point of bearing of the front end of the under brace at D, Fig. 1, accordingly, and the operation will be exactly the same.

In all cases where it is desired to use this under-brace B under the front end of the spring, as well as under the rear end, I make it in one piece, extending from one end to the other of the mainspring, and, in any appropriate manner, rigidly secure its center between the ends to the center of the under side of the spring A, at a proper distance below the spring, so as to make it parallel with the lower side of the spring A throughout its entire length. (See dotted lines T′, Fig 1.) In this case the under-brace B, as shown by dotted lines T′, would be nothing more nor less than a duplicate of the spring A, the two operating together, one over the other, with their centers rigidly connected together the same distance apart as will be their bearings at their outer ends, and so vibrate parallel with each other throughout the entire length, and operate the same in front, as now shown, from center E D to the hind axle, as seen in Fig. 1; and the cross-braces B′, Fig. 2, should, in this mode of applying the under-brace, be placed in front to the cross-bar S and the springs A, as well as to the hind axle. (See Fig. 2.)

A modification for the application of this under-brace B, in combination with half-elliptic side spring, is to shape and extend its rear end, as shown by the dotted lines A′, Fig. 1, and by a stirrup or otherwise connect the top end to the body-loop; and in this modification the extension of the under-brace is virtually a C-spring, acting in combination with the half-elliptic side spring.

In this combination of a C-spring, in the place of the short under-brace B, with the side spring A, the C-spring A′, in dotted lines, Fig. 1, will rest in the bearing O underneath the axle, while the end of the spring A will rest and operate in its bearing at N, as shown. This combination of the C-spring with half-elliptic side springs applies equally to both ends of the spring A when required so to be used.

The front end of the under-brace B and the rear end of the carrier-brace C may, if desired, be hinged upon one bearing under the center of the spring, and operated equally well. The carrier-brace C is formed as plainly shown by Fig. 1, and secured to the cross-bar S in the manner clearly seen in Fig. 5. The rear end of this brace is secured to the under side of the spring, the same as the under-brace B. The front end of the carrier-brace takes a C shape, terminating with an eye to receive the bolt holding the upper end of the stirrup H, and in the lower end of this stirrup is secured the front end of the spring A. The application of the under-brace B and carrier-brace C to half-elliptic side springs relieves the latter from all end strain, which otherwise they would have to sustain in a gearing having no perch. This carrier-brace C may also be made of a single leaf of heavy spring-steel, or of two leaves of appropriate proportion, and clipped to the cross-bar S in the usual manner, and answer the same purpose as if made of iron, as now shown in the drawing.

Having thus described my invention, what I claim, and desire to secure by Letters Patent, is—

1. Half-elliptic side springs operated upon a carrier-brace, C, or its equivalent, substantially as and for the purpose set forth.

2. The under-brace B, constructed, applied, and operating in combination with a half-elliptic side or C spring, in such manner that the parallel action with each other shall prevent the rotation of the axles in gearing without perch, substantially as specified.

3. In a no-perch vehicle, two side springs arranged in different horizontal planes, and rigidly secured together at or near a point central between their outer ends, having substantially the same distance between the planes throughout their entire length, and adapted to vibrate in unison with each other, substantially as specified.

4. In combination with the springs A under-brace B, the braces B′, arranged diagonally in front and back of the cross-center of the springs, or to either end from the cross-center of the springs, substantially as shown and described.

5. The shackle-clip P′, provided with the bearings N O, substantially as and for the purpose set forth.

6. The clip-yoke E, having ears D formed thereon, substantially as and for the purpose specified.

7. In a no-perch vehicle, two side springs arranged in different horizontal planes, which are substantially parallel throughout, connected centrally, so as to vibrate in unison, and having their outer ends connected to opposite sides of the axle, substantially as and for the purpose specified.

In testimony that I claim the above as my invention I hereunto set my hand this 21st day of April, A. D. 1877.

CYRUS W. SALADEE.

Witnesses:
GEORGE SHERMAN,
GEO. A. BLAKE.